United States Patent
Ryder et al.

(10) Patent No.: US 12,541,374 B2
(45) Date of Patent: Feb. 3, 2026

(54) RECONFIGURING EDGE APPLICATIONS AT RUNTIME

(71) Applicant: Cisco Technology, Inc., San Jose, CA (US)

(72) Inventors: Benjamin William Ryder, Lausanne (CH); Andre Jean Marie Surcouf, Saint-leu-la-Forêt (FR); Rafael Machado da Silva, Braga (PT); Dominik Kolonits, Budapest (HU)

(73) Assignee: Cisco Technology, Inc., San Jose, CA (US)

( * ) Notice: Subject to any disclaimer, the term of this patent is extended or adjusted under 35 U.S.C. 154(b) by 239 days.

(21) Appl. No.: 18/446,201

(22) Filed: Aug. 8, 2023

(65) Prior Publication Data

US 2025/0053425 A1  Feb. 13, 2025

(51) Int. Cl.
*G06F 9/445* (2018.01)
*H04L 67/00* (2022.01)
*H04L 67/10* (2022.01)

(52) U.S. Cl.
CPC .......... *G06F 9/44505* (2013.01); *H04L 67/10* (2013.01); *H04L 67/34* (2013.01)

(58) Field of Classification Search
None
See application file for complete search history.

(56) References Cited

U.S. PATENT DOCUMENTS

| | | | |
|---|---|---|---|
| 2015/0370581 A1 | 12/2015 | Bailey et al. | |
| 2016/0173331 A1 | 6/2016 | Janke et al. | |
| 2019/0243665 A1 | 8/2019 | Bolik et al. | |
| 2020/0322225 A1 | 10/2020 | Alamouti et al. | |
| 2024/0019824 A1* | 1/2024 | Gollackner | H04L 67/562 |
| 2024/0388884 A1* | 11/2024 | Hu | H04W 8/065 |
| 2024/0430238 A1* | 12/2024 | Rossetti | H04L 63/0884 |

FOREIGN PATENT DOCUMENTS

CN   110851145 A   2/2020

* cited by examiner

*Primary Examiner* — Fahmida Rahman
(74) *Attorney, Agent, or Firm* — Baker Botts L.L.P.

(57) ABSTRACT

In one embodiment, a method by a runtime configuration service at an edge site comprises receiving a registration request from a particular application comprising a particular identifier associated with the particular application, establishing a connection to a control plane application programming interface (API) gateway located in an edge backend, sending a state request message to the API gateway comprising a site identifier and the particular identifier, receiving a state response message from the API gateway comprising a desired state for the particular application, storing a desired state for the particular application, and sending a notification to the particular application indicating an updated desired state for the particular application is available.

18 Claims, 4 Drawing Sheets

RECONFIGURING EDGE APPLICATIONS AT RUNTIME

TECHNICAL FIELD

The present disclosure relates generally to distributed edge networks, and more particularly, to reconfiguring edge applications at runtime.

BACKGROUND

The adoption of cloud technologies and cloud-based services is rising constantly, but situations requiring running an application locally exist. For example, an application may need to run locally because of regulatory, security or performance reasons. A well-designed edge management system may provide an ability to develop and run modern applications at an edge site by bringing the resilience and flexibility of the cloud to the edge. The edge management system may be built on Kubernetes®. The Kubernetes® architecture may include three main components: a control plane, nodes, and pods. A control plane of the edge management system runs in the cloud and manages nodes, sites, and applications. Within the edge management system, applications may be deployed via Kubernetes® and an initial state for an edge application may be configured at deployment time. However, the state of the edge application may change over time. Because edge applications deployed at an edge network may operate in unreliable network conditions, traditional cloud-native approaches to manage the applications as changes occur over time may be inefficient.

DESCRIPTION OF EXAMPLE EMBODIMENTS

Overview

In one or more embodiments, a method, by a runtime configuration service at an edge site, may comprise receiving a registration request from a particular application among one or more applications deployed at the edge site comprising a particular identifier associated with the particular application. The method may comprise establishing a connection to a control plane application programming interface (API) gateway located in an edge backend. The method may comprise sending a state request message to the API gateway comprising a site identifier and one or more identifiers associated with one or more registered applications. The one or more identifiers may comprise the particular identifier. The method may comprise receiving a state response message from the API gateway comprising a desired state for each of the one or more registered applications identified by the one or more identifiers. The method may comprise storing a desired state for the particular application to a storage associated with the runtime configuration service. The method may further comprise sending a notification to the particular application indicating an updated desired state for the particular application is available.

In particular embodiments, a system may comprise one or more processors, and one or more computer-readable non-transitory storage media coupled to one or more of the processors. The one or more computer-readable non-transitory storage media may comprise instructions operable when executed by one or more of the processors to cause a runtime configuration service at an edge site to receive a registration request from a particular application among one or more applications deployed at the edge site comprising a particular identifier associated with the particular application. The processors are further operable when executing the instructions to cause the runtime configuration service to establish a connection to a control plane application programming interface (API) gateway located in an edge backend. The processors are further operable when executing the instructions to cause the runtime configuration service to send a state request message to the API gateway comprising a site identifier and one or more identifiers associated with one or more registered applications. The one or more identifiers may comprise the particular identifier. The processors are further operable when executing the instructions to cause the runtime configuration service to receive a state response message from the API gateway comprising a desired state for each of the one or more registered applications identified by the one or more identifiers. The processors are further operable when executing the instructions to cause the runtime configuration service to store a desired state for the particular application to a storage associated with the runtime configuration service. The processors are further operable when executing the instructions to cause the runtime configuration service to send a notification to the particular application indicating an updated desired state for the particular application is available.

In one or more embodiments, one or more computer-readable non-transitory storage media may embody software that is operable, when executed by a runtime configuration service at an edge site, to receive a registration request from a particular application among one or more applications deployed at the edge site comprising a particular identifier associated with the particular application. The software may be further operable when executed by the runtime configuration service to establish a connection to a control plane application programming interface (API) gateway located in an edge backend. The software may be further operable when executed by the runtime configuration service to send a state request message to the API gateway comprising a site identifier and one or more identifiers associated with one or more registered applications. The one or more identifiers may comprise the particular identifier. The software may be further operable when executed by the runtime configuration service to receive a state response message from the API gateway comprising a desired state for each of the one or more registered applications identified by the one or more identifiers. The software may be further operable when executed by the runtime configuration service to store a desired state for the particular application to a storage associated with the runtime configuration service. The software may be further operable when executed by the runtime configuration service to send a notification to the particular application indicating an updated desired state for the particular application is available.

Example Embodiments

In particular embodiments, an edge management system may reconfigure edge applications with unreliable network connections at runtime. The adoption of cloud technologies and cloud-based services is rising constantly, but situations requiring running an application locally exist. For example, an application may need to run locally because of regulatory, security or performance reasons. A well-designed edge management system may provide an ability to develop and run modern applications at an edge site by bringing the resilience and flexibility of the cloud to the edge. Even though edge devices often have limited resources, an edge management system may be designed with scalability in mind, such that the edge management system may handle application deployments across several nodes per sites easily, even across thousands of sites.

In particular embodiments, the edge management system may be built on Kubernetes®. An edge node is a physical or virtual edge device that can run a container instance, such as Kubernetes® container. The edge nodes may be grouped into logical units called edge sites. For example, sites may be created based on the physical location of the facilities. Then, each node may be assigned to one of the sites where the node is located.

A control plane of the edge management system may be a SaaS solution that may be running in the cloud and may communicate with each site. The control plane may manage nodes, sites, and applications. The edge management system should be able to takes care of deploying and running the applications on the selected sites and keeps them running. For example, the edge management system may reconfigure applications at runtime or redeploy applications when a node fails. The edge management system may also optimally manage the resource requirements of the applications on the available nodes.

Because applications deployed at an edge network may operate in an unreliable setting, traditional cloud-native approaches to manage the applications may face a number of challenges. For example, applications at edge sites may need to connect to the edge backend to find their desired states rather than the control plane in the edge backend pushes the desired state to an application due to unreliable network connections the edge applications may experience. Within an edge management system, applications may be deployed via Kubernetes® and initial state may be configured at deployment time. However, the state an application should be in may change over time. In such a case, the application may need to be reconfigured rather than being completely redeployed, which incurs downtime of the application. An event-driven display (EDD) application that displays visual content to screens may be an example. An EDD application may display video content from a remote source to one or more connected displays within an edge site. The Internet Protocol (IP) address of the remote source may need to be changed from time to time as the displayed video content changes. In such a case, the EDD application may need to be reconfigured at runtime to connect to a new IP address. Furthermore, an application may be deployed on several sites, but each of the targeted sites may require a different configuration for the application. Finally, applications deployed across multiple edge nodes as Daemonsets might need individual configuration and state defined when each of the applications controls a number of screens attached to corresponding node, where each screen displays different content. In particular embodiments, an edge management system may employ a Kubernetes® service, called runtime configuration service, at each edge site that connects to a control plane API gateway at the edge backend and fetches an up-to-date desired state for each of the registered applications from the. The runtime configuration service may cache the fetched desired state and send a notification to each of the registered applications that need to be reconfigured.

In particular embodiments, a runtime configuration service may be automatically deployed. In particular embodiments, the runtime configuration service may be deployed as a requirement of the applications at the edge site. In particular embodiments, the runtime configuration service at an edge site may receive a registration request from a particular application among one or more applications deployed at the edge site comprising a particular identifier associated with the particular application. The registration request may further comprise an initial state of the particular application. The initial state of the particular application may be described in a metadata describing deployment of the particular application. The runtime configuration service may store the initial state of the particular application as a current state of the particular application to a storage associated with the runtime configuration service. In particular embodiments, the runtime configuration service may establish a connection to a control plane API gateway located in an edge backend. In particular embodiments, the connection to the control plane API gateway may be established using WebSocket protocol. In particular embodiments, the connection to the control plane API gateway may be established using long polling protocol. In particular embodiments, the edge backend may be located in a cloud. In particular embodiments, the runtime configuration service may send a state request message to the API gateway comprising a site identifier and one or more identifiers associated with one or more registered applications. The one or more identifiers may comprise the particular identifier. In particular embodiments, the runtime configuration service may send a state request message at each of pre-determined time instances upon establishing the connection to the control plane API gateway is successful. In particular embodiments, a user may configure the desired state for the particular application via a northbound API in batch, individually, or per group. In particular embodiments, the runtime configuration service may receive a state response message from the API gateway comprising a desired state for each of the one or more registered applications identified by the one or more identifiers. In particular embodiments, a desired state for an application may be represented in a serializable format. In particular embodiments, a desired state for an application may comprise a series of instructions that the application needs to follow when the application restarts. In particular embodiments, a desire state for an application may be empty when no reconfiguration is needed for the application. The runtime configuration service may determine whether the desired state for the particular application is empty. The runtime configuration service may determine whether the desired state for the particular application is different from the current state of the particular application. In particular embodiments, the runtime configuration service may store a desired state for the particular application to the storage associated with the runtime configuration service. In particular embodiments, the runtime configuration service may send a notification to the particular application indicating an updated desired state for the particular application is available. In particular embodiments, the runtime configuration service may receive a request from the particular application for the desired state for the particular application. In particular embodiments, the particular application may send the request in response to the notification. In particular embodiments, the particular application may send the request at each of pre-determined time instances. The runtime configuration service may retrieve the desired state for the particular application from the storage. The runtime configuration service may send the desired state for the particular application. The runtime configuration service may update the current state of the particular application in the storage with the desired state for the particular application sent to the particular application. In particular embodiments, the runtime configuration service may receive a second registration request from the particular application comprising a second state information associated with the particular application. In particular embodiments, the particular application may send the second registration request upon being reset. The runtime configuration service may determine that the desired state for the particular application stored in the storage is newer than the second state information in the second registration request. The runtime configuration service may send, in response to the determination, the desired state for the particular application to the particular application. The particular application may update its state to the desired state for the particular application upon receiving the desired state.

Technical advantages of certain embodiments of this disclosure may include one or more of the following. Certain apparatus and methods described herein may reconfigure an edge application with unreliable network connections at runtime. The apparatus and the method may reduce amount of total network traffic for reconfiguring edge applications on an edge site as a runtime configuration service may establish a connection to an edge backend and pull desired states for registered edge applications at once. Each edge application may not need to connect to the edge backend for checking whether a new desired state for the edge application is available. The apparatus and the method may enable the edge applications to keep eventually-consistent state by caching the desired state for each edge application at the runtime configuration service at an edge site. An edge application may update its state when the application is able to establish a connection to the runtime configuration service at the edge site.

Other technical advantages will be readily apparent to one skilled in the art from the following figures, descriptions, and claims. Moreover, while specific advantages have been enumerated above, various embodiments may include all, some, or none of the enumerated advantages.

Figure 1:
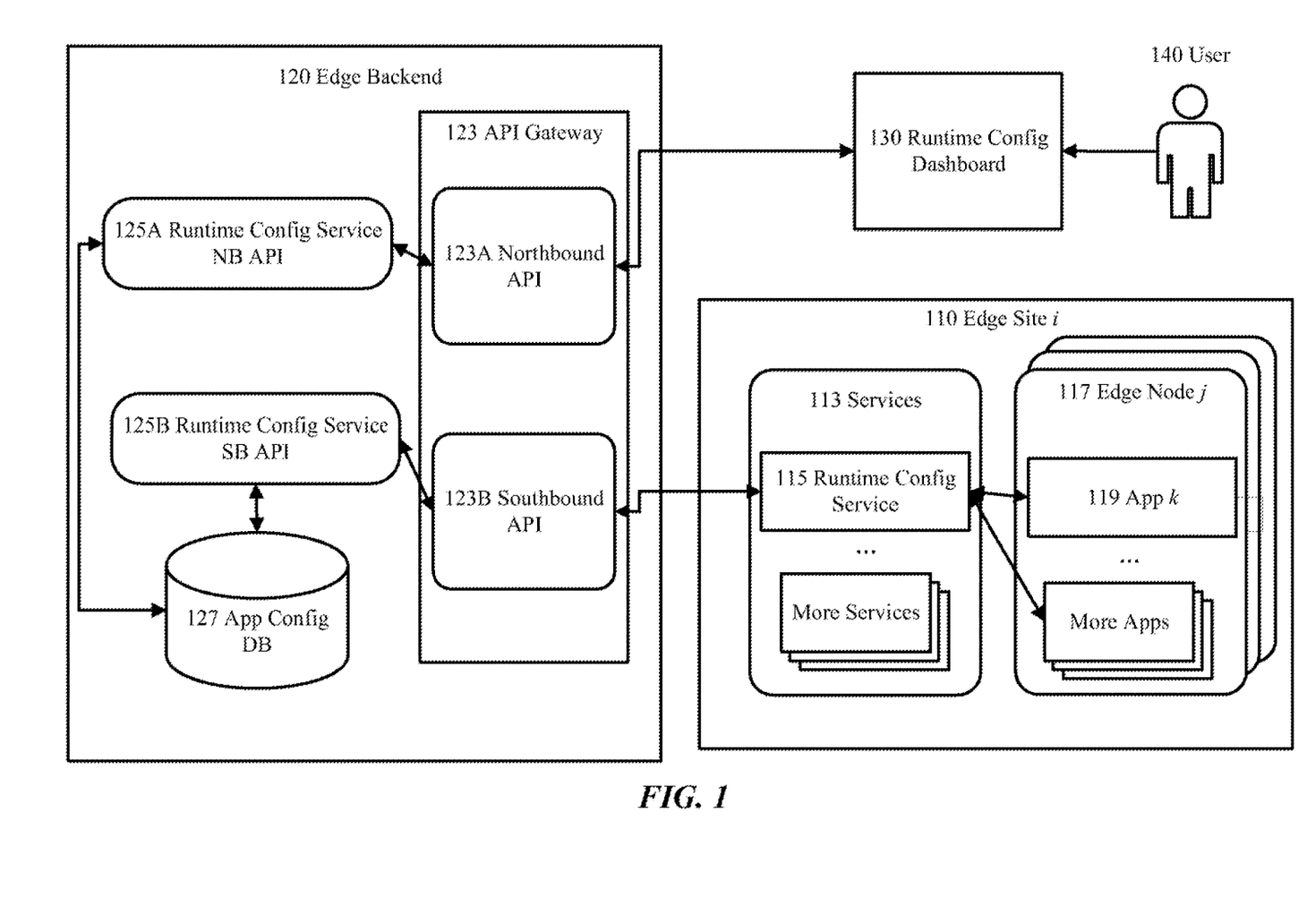
FIG. 1 illustrates an example logical architecture of an edge management system control plane.

FIG. 1 illustrates an example logical architecture of an edge management system control plane. In the example illustrated in FIG. 1, a runtime configuration service 115 may be deployed at an edge site i 110. The runtime configuration service 115 may be a Kubernetes® service. The runtime configuration service 115 may be one of a plurality of services 113 available at the edge site i 110. In particular embodiments, the runtime configuration service 115 may be automatically deployed at the edge site i 110. In particular embodiments, the runtime configuration service 115 may be deployed as a requirement of one or more applications deployed at the edge site i 110 including an application k 119. In particular embodiments, the application k 119 may run on an edge node j 117. The edge node j 117 may have more applications running on it. The edge site i 110 may comprise a plurality of edge nodes, each having one or more edge applications running on it. Each of the edge applications at the edge site i 110 may register with the runtime configuration service 115 to get a notification when a new desired state for the edge application becomes available. Although this disclosure describes a particular edge site, this disclosure contemplates any suitable edge site.

In particular embodiments, the runtime configuration service at an edge site may receive a registration request from a particular application among one or more applications deployed at the edge site comprising a particular identifier associated with the particular application. The registration request may further comprise an initial state of the particular application. The initial state of the particular application may be described in a metadata describing deployment of the particular application. The runtime configuration service may store the initial state of the particular application as a current state of the particular application to a storage associated with the runtime configuration service. As an example and not by way of limitation, continuing with a prior example, the edge application k 119 may send a registration request message to the runtime configuration service 115 deployed at the edge site i 110 right after the edge application k 119 is deployed. The registration request message may comprise a unique identifier identifying the edge application k 119. In particular embodiments, the edge site i 110, an application identity of the edge application k 119, and an instance sequence number of the application k 119 may be identified based on the unique identifier. The instance sequence number of the application k 119 may be unique among application instances having the application identity within the edge site i 110. The registration request message may also comprise an initial state of the edge application k 119. Upon receiving the registration request message from the edge application k 119, the runtime configuration service 115 may create a record associated with unique identifier corresponding to the edge application k 119. Also, the runtime configuration service 115 may store the initial state as a current state of the edge application k 119. In particular embodiments, the runtime configuration service 115 may send a registration response message to the edge application k 119 indicating that the registration was successful. Although this disclosure describes registering a new edge application with the runtime configuration service in a particular manner, this disclosure contemplates registering a new edge application with the runtime configuration service in any suitable manner.

In particular embodiments, the runtime configuration service may establish a connection to a control plane API gateway located in an edge backend. In particular embodiments, the connection to the control plane API gateway may be established using WebSocket protocol. In particular embodiments, the connection to the control plane API gateway may be established using long polling protocol. In particular embodiments, the edge backend may be located in a cloud. As an example and not by way of limitation, continuing with a prior example, an edge backend 120 in a cloud may manage a plurality of edge sites including edge site i 110. The edge backend 120 may also be referred to as a control center. The edge backend 120 may comprise a control plane API gateway 123 that may handle control plane communications. The control plane API gateway 123 may have a northbound API 123A that communicates with one or more runtime configuration dashboard 130 and a southbound API 123B that communicates with runtime configuration services from the plurality of edge sites. The runtime configuration service 115 at edge site i 110 may establish a communication connection with the southbound API 123B. For the communication connection, WebSocket, long polling, or any suitable protocol may be used. Although this disclosure describes establishing a connection with a control plane API gateway at the edge backend in a particular manner, this disclosure contemplates establishing a connection with a control plane API gateway at the edge backend in any suitable manner.

In particular embodiments, the runtime configuration service may send a state request message to the API gateway comprising a site identifier and one or more identifiers associated with one or more registered applications. The one or more identifiers may comprise the particular identifier. In particular embodiments, the runtime configuration service may send a state request message at each of pre-determined time instances upon establishing the connection to the control plane API gateway is successful. As an example and not by way of limitation, continuing with a prior example, the runtime configuration service 115 may send a state request message to the southbound API 123B for one or more registered edge applications at edge site i 110. The one or more registered edge applications may comprise the edge application k 119. The state request message may comprise a site identifier associated with the edge site i 110 and application identifiers associated with the one or more registered applications. In particular embodiments, the state request message may further comprise current state for each of the one or more registered applications. In particular embodiments, the runtime configuration service 115 may send a state request message for a subset of the one or more registered applications. In particular embodiments, the runtime configuration service 115 may send a state request message for all of the one or more registered applications. In particular embodiments, the runtime configuration service 115 may send a state request message on demand. For example, the runtime configuration service 115 may send a state request message upon receiving a registration request from a new application. The state request message may comprise an identifier associated with the new application. For another example, the runtime configuration service 115 may send a state request message upon detecting a network connectivity to the edge backend 120 is restored. In particular embodiments, the runtime configuration service 115 may send a state request message at pre-scheduled time instances. Although this disclosure describes sending a state request message to the control plane API gateway at the edge backend in a particular manner, this disclosure contemplates sending a state request message to the control plane API gateway at the edge backend in any suitable manner.

In particular embodiments, a user may configure the desired state for the particular application via a northbound API in batch, individually, or per group. As an example and not by way of limitation, continuing with a prior example, a user 140 may configure a desired state for the edge application k 119 using the runtime configuration dashboard 130. The runtime configuration dashboard 130 may send the new desired state for the edge application k 119 to the northbound API 123A. The northbound API 123A may forward the new desired state for the edge application k 119 to a runtime configuration service northbound API 125A at the edge backend 120. The runtime configuration service northbound API 125A at the edge backend 120 may update the desired state information for the edge application k 119 in an application configuration database 127 at the edge backend 120. In particular embodiments, the user 140 may modify a desired state for applications in batch. In particular embodiments, the user 140 may revise a desired state for a group of applications. In particular embodiments, the user 140 may revise a desired state of a single application. Although this disclosure describes configuring a new desired state for an application by a user in a particular manner, this disclosure contemplates configuring a new desired state for an application by a user in any suitable manner.

In particular embodiments, the runtime configuration service may receive a state response message from the API gateway comprising a desired state for each of the one or more registered applications identified by the one or more identifiers. In particular embodiments, a desired state for an application may be represented in a serializable format. In particular embodiments, a desired state for an application may comprise a series of instructions that the application needs to follow when the application restarts. In particular embodiments, a desire state for an application may be empty when no reconfiguration is needed for the application. The runtime configuration service may determine whether the desired state for the particular application is empty. The runtime configuration service may determine whether the desired state for the particular application is different from the current state of the particular application. In particular embodiments, the runtime configuration service may store the desired state for each of the one or more applications to the storage associated with the runtime configuration service. In particular embodiments, the runtime configuration service may send a notification to the particular application indicating an updated desired state for the particular application is available. As an example and not by way of limitation, continuing with a prior example, when runtime configuration service northbound API 125A updates the desired state information in the application configuration database 127, Structured Query Language (SQL) triggers on the application configuration database 127 may detect changes in the desired state of the edge application k 119 and send the updated desired state of the edge application k 119 to a runtime configuration service southbound API 125B. The runtime configuration service southbound API 125B may generate a state response message comprising the updated desired state of the edge application k 119 and forward the generated state response message to the southbound API 123B of the control plane API gateway 123. The southbound API 123B may send the state response message to the runtime configuration service 115 at the edge site i 110. Upon receiving the state response message, the runtime configuration service 115 may store a new desired state for the edge application k 119 into the storage. The runtime configuration service 115 may also send a notification to the edge application k 119 indicating the new desired state for the edge application k 119 is available. As another example and not by way of limitation, continuing with a prior example, upon receiving the state request message from the runtime configuration service 115, the southbound API 123B may forward the state request to the runtime configuration service southbound API 125B. The runtime configuration service southbound API 125B may retrieve desired state information for the one or more registered applications identified by the one or more identifiers in the state request message. The runtime configuration service southbound API 125B may generate a state response message with the retrieved desired state information and forward the state response message to the southbound API 123B. The southbound API 123B may send the state response message to the runtime configuration service 115 at the edge site i 110. Upon receiving the state response message, the runtime configuration service 115 may filter applications whose desired state does not change. For applications having a new desired state, the runtime configuration service 115 may store the new desired state into a storage. The runtime configuration service 115 may also send a notification to each of the applications having a new desired state indicating an updated desired state for the application is available. Although this disclosure describes receiving a state response message from the API gateway in a particular manner, this disclosure contemplates receiving a state response message from the API gateway in any suitable manner.

In particular embodiments, the runtime configuration service may receive a request from the particular application for the desired state for the particular application. In particular embodiments, the particular application may send the request in response to the notification. In particular embodiments, the particular application may send the request at each of pre-determined time instances. The runtime configuration service may retrieve the desired state for the particular application from the storage. The runtime configuration service may send the desired state for the particular application. The runtime configuration service may update the current state of the particular application in the storage with the desired state for the particular application sent to the particular application. As an example and not by way of limitation, continuing with a prior example, the runtime configuration service 115 may receive a request from the edge application k 119. In particular embodiments, the edge application k 119 may send the request upon receiving the notification from the runtime configuration service 115. In particular embodiments, the edge application k 119 may miss the notification due to network connectivity issue. The edge application k 119 may send a request at pre-determined time instances. The runtime configuration service 115 may retrieve the desired state for the edge application k 119 from the storage. The runtime configuration service 115 may send the retrieved desired state to the edge application k 119. The runtime configuration service 115 may update the current state of the edge application k 119 with the sent desired state in the storage. Upon receiving the desired state, the edge application k 119 may update its state (e.g., configurations) with the received desired state. Although this disclosure describes delivering a new desired state to an edge application in a particular manner, this disclosure contemplates delivering a new desired state to an edge application in any suitable manner.

In particular embodiments, the runtime configuration service may receive a second registration request from the particular application comprising a second state information associated with the particular application. In particular embodiments, the particular application may send the second registration request upon being reset. The runtime configuration service may determine that the desired state for the particular application stored in the storage is newer than the second state information in the second registration request. The runtime configuration service may send, in response to the determination, the desired state for the particular application to the particular application. The particular application may update its state to the desired state for the particular application upon receiving the desired state. As an example and not by way of limitation, continuing with a prior example, the edge application k 119 may be reset due to a hardware failure, a software failure, or any suitable reason. The edge application k 119 may send a new registration request message to the runtime configuration service 115 comprising a unique identifier associated with the edge application k 119 and the initial state defined at the deployment time. Upon receiving the new registration request message from the edge application k 119, the runtime configuration service 115 may determine that the edge application k 119 has already registered with the runtime configuration service 115 based on the unique identifier. The runtime configuration service 115 may also determine that the desired state for the edge application k 119 stored in the storage is newer than the initial state within the registration request message. The runtime configuration service 115 may send the stored desired state for the edge application k 119 to the edge application k 119. Upon receiving the desired state from the runtime configuration service 115, the edge application k 119 may update the state from the initial state to the received desired state. Although this disclosure describes recovering a desired state of an edge application with the runtime configuration service in a particular manner, this disclosure contemplates recovering a desired state of an edge application with the runtime configuration service in any suitable manner.

Figure 2:
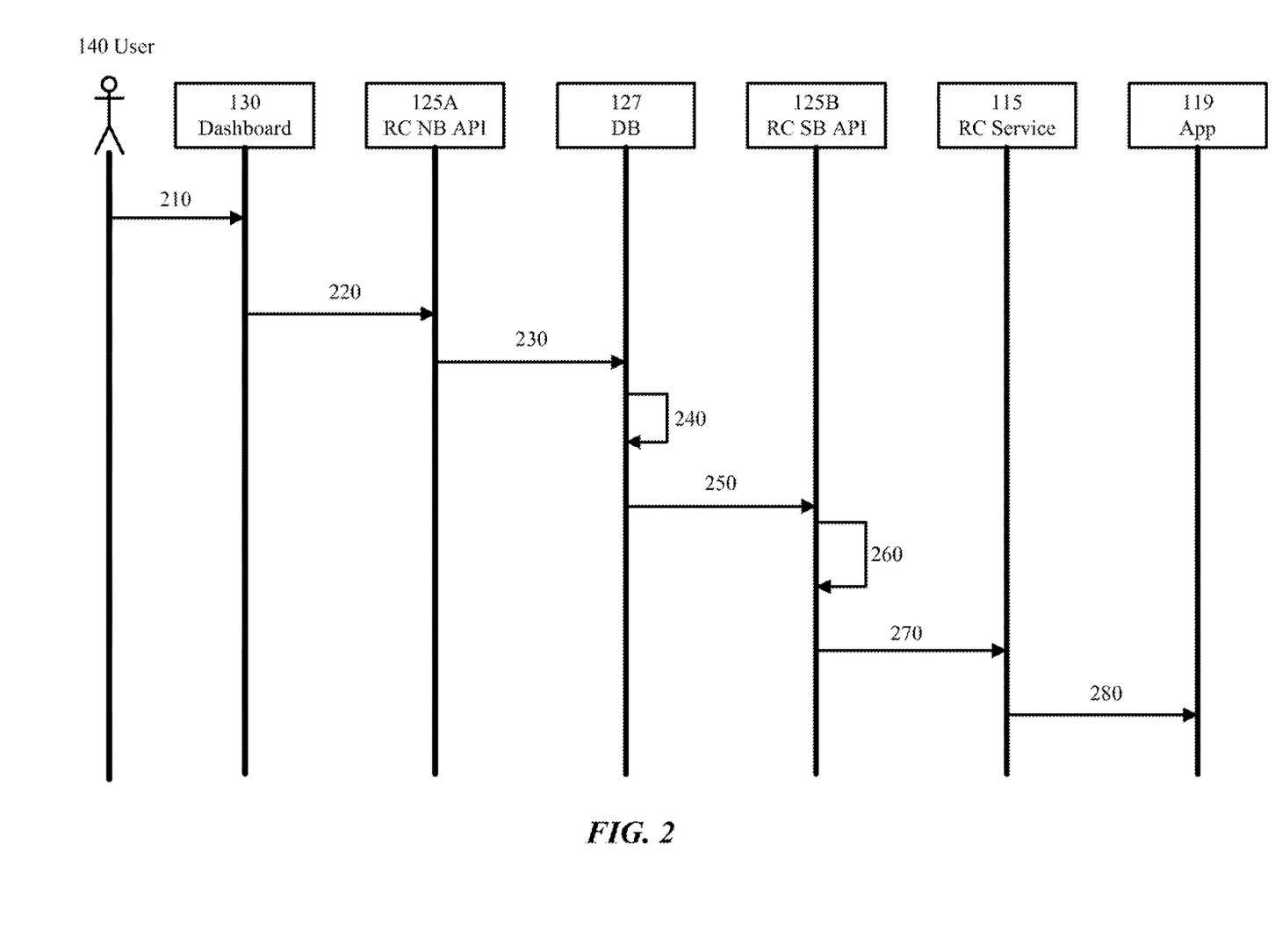
FIG. 2 illustrates an example message flow for reconfiguring an edge application at runtime.

FIG. 2 illustrates an example message flow for reconfiguring an edge application at runtime. At step 210, the user 140 may provide information regarding a new desired state for the particular application to the runtime configuration dashboard 130. The user 140 may fill a form presented by the runtime configuration dashboard 130 and click a button to submit the new desired state for the particular application. At step 220, the runtime configuration dashboard 130 may send the new desired state for the particular application to the runtime configuration service northbound API 125A through the northbound API 123A at the control plane API gateway 123 (not shown). At step 230, the runtime configuration service northbound API 125A may update the desired state for the particular application on the application configuration database 127 using an SQL query. At step 240, the SQL triggers on the application configuration database 127 may detect changes on the desired state for the particular application. At step 250, the SQL triggers may send the updated desired state for the particular application to the runtime configuration service southbound API 125B. At step 260, the runtime configuration service southbound API 125B may receive the updated desired state for the particular application. At step 270, the runtime configuration service southbound API 125B may generate a state response message comprising the updated desired state for the particular application and send the state response message to the runtime configuration service 115 at the edge site. To send the state response message to the runtime configuration service 115, the runtime configuration service southbound API 125B may forward the generated state response message to the southbound API 123B of the control plane API gateway 123. The southbound API 123B may send the state response message to the runtime configuration service 115. At step 280, the runtime configuration service 115 may send a notification to the particular application (e.g., application k 119) indicating that a new desired state for the particular application is available. Although this disclosure describes a particular message flow for reconfiguring an edge application at runtime, this disclosure contemplates any suitable message flow for reconfiguring an edge application at runtime.

Figure 3:
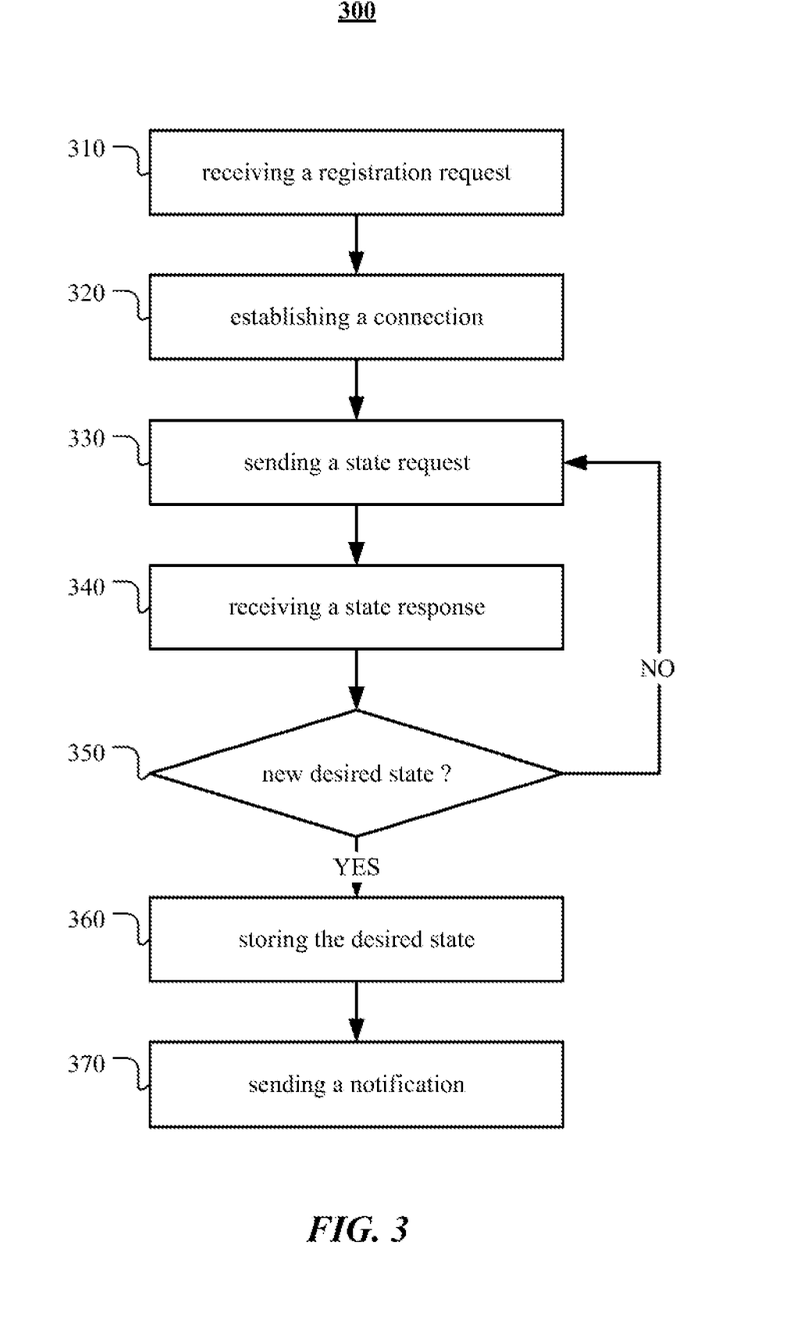
FIG. 3 illustrates an example method for reconfiguring an edge application at runtime.

FIG. 3 illustrates an example method 300 for reconfiguring an edge application at runtime. The method may begin at step 310, where a runtime configuration service 115 may receive a registration request from a particular application among one or more applications deployed at the edge site comprising a particular identifier associated with the particular application. At step 320, the runtime configuration service 115 may establish a connection to a control plane API gateway located in an edge backend. At step 330, the runtime configuration service 115 may send a state request message to the API gateway comprising a site identifier and one or more identifiers associated with one or more registered applications. The one or more identifiers may comprise the particular identifier. At step 340, the runtime configuration service 115 may receive a state response message from the API gateway comprising a desired state for each of the one or more registered applications identified by the one or more identifiers. At step 350, the runtime configuration service 115 may determine whether the received desired state for the particular application is a new desired state for the particular application. If the received desired state for the particular application is a new desired state for the particular application, the method may proceed to step 360, where the runtime configuration service 115 may storing the desired state for the particular application to a storage associated with the runtime configuration service. At step 370, the runtime configuration service 115 may sending a notification to the particular application indicating an updated desired state for the particular application is available. Particular embodiments may repeat one or more steps of the method of FIG. 3, where appropriate. Although this disclosure describes and illustrates particular steps of the method of FIG. 3 as occurring in a particular order, this disclosure contemplates any suitable steps of the method of FIG. 3 occurring in any suitable order. Moreover, although this disclosure describes and illustrates an example method for reconfiguring an edge application at runtime including the particular steps of the method of FIG. 3, this disclosure contemplates any suitable method for reconfiguring an edge application at runtime including any suitable steps, which may include all, some, or none of the steps of the method of FIG. 3, where appropriate. Furthermore, although this disclosure describes and illustrates particular components, devices, or systems carrying out particular steps of the method of FIG. 3, this disclosure contemplates any suitable combination of any suitable components, devices, or systems carrying out any suitable steps of the method of FIG. 3.

Figure 4:
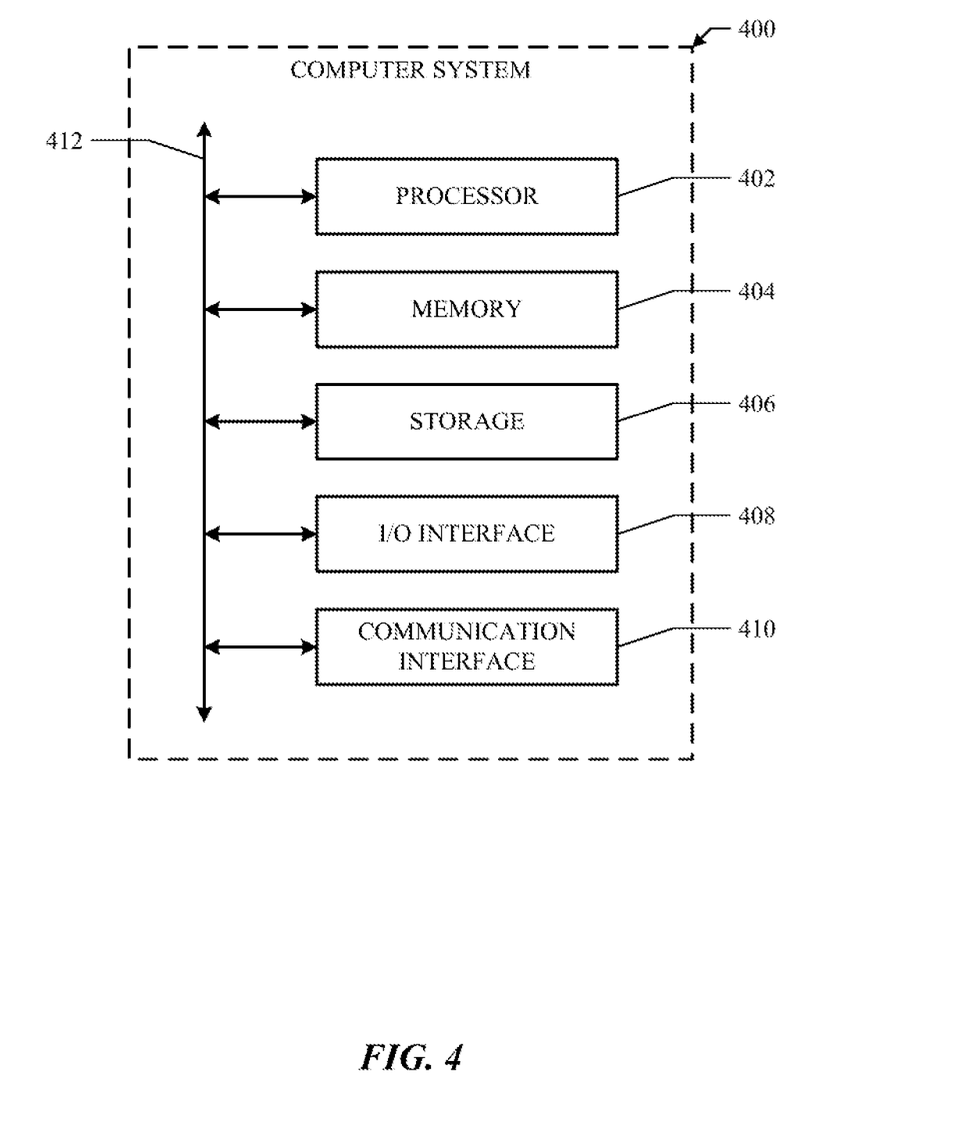
FIG. 4 illustrates an example computing system.

FIG. 4 illustrates an example computer system 400. In particular embodiments, one or more computer systems 400 perform one or more steps of one or more methods described or illustrated herein. In particular embodiments, one or more computer systems 400 provide functionality described or illustrated herein. In particular embodiments, software running on one or more computer systems 400 performs one or more steps of one or more methods described or illustrated herein or provides functionality described or illustrated herein. Particular embodiments include one or more portions of one or more computer systems 400. Herein, reference to a computer system may encompass a computing device, and vice versa, where appropriate. Moreover, reference to a computer system may encompass one or more computer systems, where appropriate.

This disclosure contemplates any suitable number of computer systems 400. This disclosure contemplates computer system 400 taking any suitable physical form. As example and not by way of limitation, computer system 400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 400 may include one or more computer systems 400; be unitary or distributed; span multiple locations; span multiple machines; span multiple data centers; or reside in a cloud, which may include one or more cloud components in one or more networks. Where appropriate, one or more computer systems 400 may perform without substantial spatial or temporal limitation one or more steps of one or more methods described or illustrated herein. As an example and not by way of limitation, one or more computer systems 400 may perform in real time or in batch mode one or more steps of one or more methods described or illustrated herein. One or more computer systems 400 may perform at different times or at different locations one or more steps of one or more methods described or illustrated herein, where appropriate.

In particular embodiments, computer system 400 includes a processor 402, memory 404, storage 406, an input/output (I/O) interface 408, a communication interface 410, and a bus 412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 402 includes hardware for executing instructions, such as those making up a computer program. As an example and not by way of limitation, to execute instructions, processor 402 may retrieve (or fetch) the instructions from an internal register, an internal cache, memory 404, or storage 406; decode and execute them; and then write one or more results to an internal register, an internal cache, memory 404, or storage 406. In particular embodiments, processor 402 may include one or more internal caches for data, instructions, or addresses. This disclosure contemplates processor 402 including any suitable number of any suitable internal caches, where appropriate. As an example and not by way of limitation, processor 402 may include one or more instruction caches, one or more data caches, and one or more translation lookaside buffers (TLBs). Instructions in the instruction caches may be copies of instructions in memory 404 or storage 406, and the instruction caches may speed up retrieval of those instructions by processor 402. Data in the data caches may be copies of data in memory 404 or storage 406 for instructions executing at processor 402 to operate on; the results of previous instructions executed at processor 402 for access by subsequent instructions executing at processor 402 or for writing to memory 404 or storage 406; or other suitable data. The data caches may speed up read or write operations by processor 402. The TLBs may speed up virtual-address translation for processor 402. In particular embodiments, processor 402 may include one or more internal registers for data, instructions, or addresses. This disclosure contemplates processor 402 including any suitable number of any suitable internal registers, where appropriate. Where appropriate, processor 402 may include one or more arithmetic logic units (ALUs); be a multi-core processor; or include one or more processors 402. Although this disclosure describes and illustrates a particular processor, this disclosure contemplates any suitable processor.

In particular embodiments, memory 404 includes main memory for storing instructions for processor 402 to execute or data for processor 402 to operate on. As an example and not by way of limitation, computer system 400 may load instructions from storage 406 or another source (such as, for example, another computer system 400) to memory 404. Processor 402 may then load the instructions from memory 404 to an internal register or internal cache. To execute the instructions, processor 402 may retrieve the instructions from the internal register or internal cache and decode them. During or after execution of the instructions, processor 402 may write one or more results (which may be intermediate or final results) to the internal register or internal cache.

Processor 402 may then write one or more of those results to memory 404. In particular embodiments, processor 402 executes only instructions in one or more internal registers or internal caches or in memory 404 (as opposed to storage 406 or elsewhere) and operates only on data in one or more internal registers or internal caches or in memory 404 (as opposed to storage 406 or elsewhere). One or more memory buses (which may each include an address bus and a data bus) may couple processor 402 to memory 404. Bus 412 may include one or more memory buses, as described below. In particular embodiments, one or more memory management units (MMUs) reside between processor 402 and memory 404 and facilitate accesses to memory 404 requested by processor 402. In particular embodiments, memory 404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 404 may include one or more memories 404, where appropriate. Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 400, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 402 and storage 406, where appropriate. Where appropriate, storage 406 may include one or more storages 406. Although this disclosure describes and illustrates particular storage, this disclosure contemplates any suitable storage.

In particular embodiments, I/O interface 408 includes hardware, software, or both, providing one or more interfaces for communication between computer system 400 and one or more I/O devices. Computer system 400 may include one or more of these I/O devices, where appropriate. One or more of these I/O devices may enable communication between a person and computer system 400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 408 for them. Where appropriate, I/O interface 408 may include one or more device or software drivers enabling processor 402 to drive one or more of these I/O devices. I/O interface 408 may include one or more I/O interfaces 408, where appropriate. Although this disclosure describes and illustrates a particular I/O interface, this disclosure contemplates any suitable I/O interface.

In particular embodiments, communication interface 410 includes hardware, software, or both providing one or more interfaces for communication (such as, for example, packet-based communication) between computer system 400 and one or more other computer systems 400 or one or more networks. As an example and not by way of limitation, communication interface 410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 410 for it. As an example and not by way of limitation, computer system 400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 400 may include any suitable communication interface 410 for any of these networks, where appropriate. Communication interface 410 may include one or more communication interfaces 410, where appropriate. Although this disclosure describes and illustrates a particular communication interface, this disclosure contemplates any suitable communication interface.

In particular embodiments, bus 412 includes hardware, software, or both coupling components of computer system 400 to each other. As an example and not by way of limitation, bus 412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 412 may include one or more buses 412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by a runtime configuration service at an edge site:
   receiving, from a particular application among one or more applications deployed at the edge site, during a runtime of the particular application that is in an initial state, a registration request comprising a particular identifier associated with the particular application, wherein the one or more applications deployed at the edge site are containerized applications, and wherein the initial state of the particular application is configured at a deployment time;
   establishing a connection to a control plane application programming interface (API) gateway located in an edge backend, wherein the edge backend is located in a cloud, and wherein the runtime configuration service has intermittent network connectivity with the edge backend;
   sending, to the control plane API gateway, a state request message comprising a site identifier and one or more identifiers associated with one or more registered applications, wherein the one or more identifiers comprise the particular identifier;
   receiving, from the control plane API gateway, a state response message comprising a desired state for each of the one or more registered applications identified by the one or more identifiers, wherein a desired state for an application comprises a series of instructions that the application needs to follow to reconfigure the application when the application restarts;
   storing a desired state for the particular application to a storage associated with the runtime configuration service; and
   sending, to the particular application, during the runtime of the particular application, the desired state for the particular application to enforce the particular application to follow the series of instructions to reconfigure the particular application upon restarting of the particular application.

2. The method of claim 1, wherein the registration request further comprises an initial state of the particular application.

3. The method of claim 2, wherein the initial state of the particular application is described in a metadata describing deployment of the particular application.

4. The method of claim 2, further comprising storing the initial state of the particular application as a current state of the particular application to the storage associated with the runtime configuration service.

5. The method of claim 4, further comprising:
   determining, before storing the desired state, that the desired state for the particular application is different from the current state of the particular application.

6. The method of claim 4, further comprising:
   updating the current state of the particular application in the storage with the desired state for the particular application sent to the particular application.

7. The method of claim 1, further comprising:
   sending, after storing the desired state for the particular application to the storage associated with the runtime configuration service, to the particular application, a notification indicating an updated desired state for the particular application is available;
   receiving, from the particular application, a request for the desired state for the particular application, wherein the particular application sends the request in response to the notification; and
   retrieving, to prepare sending the desired state for the particular application, from the storage, the desired state for the particular application.

8. The method of claim 1, wherein the particular application sends a request for the desired state for the particular application at each of pre-determined time instances, and wherein the runtime configuration service, in response to the request, sends the desired state for the particular application stored in the storage associated with the runtime configuration service.

9. The method of claim 6, further comprising:
   receiving, from the particular application, a second registration request comprising a second state information associated with the particular application, wherein the particular application sends the second registration request upon being reset;
   determining that the desired state for the particular application stored in the storage is newer than the second state information in the second registration request; and
   sending, in response to the determination, to the particular application, the desired state for the particular application, wherein the particular application updates its state to the desired state for the particular application upon receiving the desired state.

10. The method of claim 1, wherein the runtime configuration service is automatically deployed.

11. The method of claim 1, wherein the runtime configuration service sends a state request message at each of pre-determined time instances upon establishing the connection to the control plane API gateway is successful.

12. The method of claim 1, wherein the connection to the control plane API gateway is established using WebSocket protocol or long polling protocol.

13. The method of claim 1, wherein a desired state for an application is represented in a serializable format.

14. The method of claim 1, wherein the runtime configuration service is deployed as a requirement of the one or more applications at the edge site.

15. The method of claim 1, wherein a user configures the desired state for the particular application via a northbound API in batch, individually, or per group.

16. A system comprising:
one or more processors; and
one or more computer-readable non-transitory storage media coupled to one or more of the processors and comprising instructions operable when executed by one or more of the processors to cause a runtime configuration service at an edge site running the system to:
receive, from a particular application among one or more applications deployed at the edge site, during a runtime of the particular application that is in an initial state, a registration request comprising a particular identifier associated with the particular application, wherein the one or more applications deployed at the edge site are containerized applications, and wherein the initial state of the particular application is configured at a deployment time;
establish a connection to a control plane application programming interface (API) gateway located in an edge backend, wherein the edge backend is located in a cloud, and wherein the runtime configuration service has intermittent network connectivity with the edge backend;
send, to the control plane API gateway, a state request message comprising a site identifier and one or more identifiers associated with one or more registered applications, wherein the one or more identifiers comprise the particular identifier;
receive, from the control plane API gateway, a state response message comprising a desired state for each of the one or more registered applications identified by the one or more identifiers, wherein a desired state for an application comprises a series of instructions that the application needs to follow to reconfigure the application when the application restarts;
store a desired state for the particular application to a storage associated with the runtime configuration service; and
send, to the particular application, during the runtime of the particular application, the desired state for the particular application to enforce the particular application to follow the series of instructions to reconfigure the particular application upon restarting of the particular application.

17. The system of claim 16, wherein the registration request further comprises an initial state of the particular application.

18. One or more computer-readable non-transitory storage media embodying software that is operable when executed to, by a runtime configuration service at an edge site:
receive, from a particular application among one or more applications deployed at the edge site, during a runtime of the particular application that is in an initial state, a registration request comprising a particular identifier associated with the particular application, wherein the one or more applications deployed at the edge site are containerized applications, and wherein the initial state of the particular application is configured at a deployment time;
establish a connection to a control plane application programming interface (API) gateway located in an edge backend, wherein the edge backend is located in a cloud, and wherein the runtime configuration service has intermittent network connectivity with the edge backend;
send, to the control plane API gateway, a state request message comprising a site identifier and one or more identifiers associated with one or more registered applications, wherein the one or more identifiers comprise the particular identifier;
receive, from the control plane API gateway, a state response message comprising a desired state for each of the one or more registered applications identified by the one or more identifiers, wherein a desired state for an application comprises a series of instructions that the application needs to follow to reconfigure the application when the application restarts;
store a desired state for the particular application to a storage associated with the runtime configuration service; and
send, to the particular application, during the runtime of the particular application, the desired state for the particular application to enforce the particular application to follow the series of instructions to reconfigure the particular application upon restarting of the particular application.

* * * * *